UNITED STATES PATENT OFFICE.

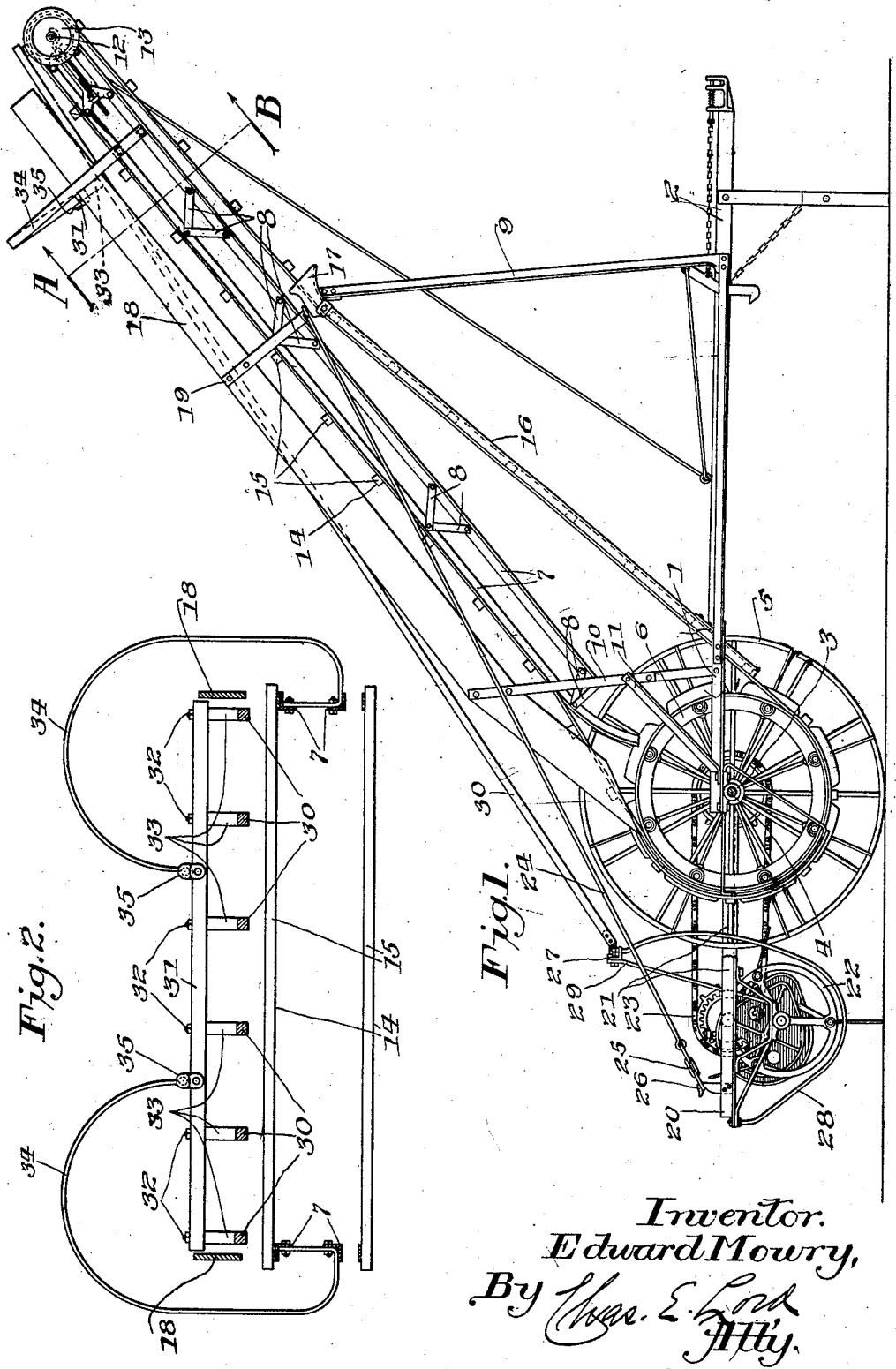

EDWARD MOWRY, OF STERLING, ILLINOIS, ASSIGNOR, BY MESNE ASSIGNMENTS, TO INTERNATIONAL HARVESTER COMPANY, A CORPORATION OF NEW JERSEY.

HAY-LOADER.

1,312,342.   Specification of Letters Patent.   Patented Aug. 5, 1919.

Application filed June 1, 1915. Serial No. 31,568.

*To all whom it may concern:*

Be it known that I, EDWARD MOWRY, a citizen of the United States, residing at Sterling, in the county of Whiteside and State of Illinois, have invented certain new and useful Improvements in Hay-Loaders, of which the following is a full, clear, and exact specification.

This invention relates to hay loaders of the endless belt type, including an upwardly inclined elevator frame carried by a wheel frame mounted upon traction wheels operatively connected with a raking cylinder adapted to gather the hay from the ground and deliver it to the endless belt, means carried by the elevator frame and coöperating with a series of compressor bars having their lower ends supported by the wheel frame and their upper ends free to rise and fall upon the stream of hay as it is being carried upward by the endless belt, and similar in design and construction to that shown in my application for Patent Serial No. 798,458, filed October 31, 1913.

The object of the invention is to provide improved means for yieldingly supporting a series of compressor bars upon the delivery end of the elevator frame whereby they are permitted a rising and falling and a lateral swinging movement to a limited extent without interfering with a free movement of the load as it is being carried upward by the endless belt mechanism.

This object is attained by means of the mechanism illustrated by the accompanying drawing, wherein—

Figure 1 is a side elevation of part of a hay loader having my invention embodied in its construction; and Fig. 2 is a cross section of the delivery end of the elevator as shown in Fig. 1 along line A—B.

The same reference characters designate like parts throughout the several views.

The frame of the machine includes forwardly extending side frame members 1, disposed upon opposite sides of the machine, having a draft bar 2 connected with their front ends and their rear ends carrying bearing boxes 3, in which is journaled an axle 4, having traction wheels 5 mounted upon its opposite ends and carrying elevator actuating wheels 6.

The elevator frame includes upwardly and forwardly inclined members 7 disposed upon opposite sides of the machine, spaced apart in parallel relation, and connected by means of strut members 8, having its upper end supported by means of vertically disposed frame members 9 connecting it with the front ends of the frame members 1, and its rear end by means of vertically disposed frame members 10, and brace members 11 connecting it with the side members of the wheel frame.

12 represents a transversely disposed shaft carried by the upper ends of frame members 7, and having wheels 13 mounted thereon, around which are carried endless elevator belts 14 that are driven by the wheels 6 and connected by means of transverse slats 15, spaced apart in the usual manner. The upper leads of the endless belts are supported by the frame members 7, and their lower leads are carried by inclined frame members 16, upon opposite sides of the machine, having their upper ends secured to guide brackets 17 connected with the frame members 7 and 9, and their lower ends with the frame members 1 adjacent the lower and forward part of the periphery of the actuating wheels 6.

18 represents guard rails disposed upon opposite sides of the elevator above the endless belt, having their lower ends secured to the upwardly extending ends of the vertical frame members 10, and their upper ends supported by means of bars 19 connecting them with the side frame members 7 of the elevator. 20 represents a supplemental frame disposed in rear of the lower end of the elevator, having its side members 21 pivotally connected with the axle 4 and carrying a raking cylinder 22 that is operatively connected with the traction wheels of the machine by means including a sprocket wheel 23; the rear end of the frame being supported by means of tension rods 24, having their upper ends secured to the guide brackets 17 and their lower ends provided with short chain members 25 whereby they may be adjustably connected with hook members 26 secured to the frame.

27 represents a bar disposed transversely across the supplemental frame above the raking cylinder and the lower end of the endless belt, and having stripper bars 28 secured thereto, and 29 represents supporting members connecting the bar 27 with the supplemental frame. 30 represents a series of longitudinally disposed compressor bars spaced apart laterally and overlying the endless carrier belt, the lower ends of the bars being pivotally connected with the transverse bar 27 in a manner permitting their upper ends to rise and fall upon the stream of hay as it is being elevated by the belt. 31 represents a transversely disposed bar secured to the upper ends of the compressor bars 30 by means of bolts 32 and vertically disposed spacing members 33. The compressor bars are more or less flexible, and as they ride upon the stream of hay that varies in its bulk and distribution upon the endless carrier, they will yield singly or in series upward or laterally, and under normal conditions will operate efficiently to compress the hay upon the carrier without any additional support. Under other conditions, as when a high wind prevails from the direction of advance of the machine, the compressor as a unit will be raised from the hay and turned rearward in a manner to impair or destroy its efficiency. To remove this defect in the operation of the machine, I have provided supporting members for the upper end of the series of bars comprising resilient bars 34, having one end secured to the side frame members 7 of the elevator frame and extending laterally from opposite sides thereof are turned vertically upward above the normal plane of the transverse bar 31, then upward and inward, and then inward and downward, having their free ends pivotally connected with the bar 31 near its middle, as by means of clip members 35. The upper parts of the resilient members 34 are in the form of a semi-circle.

In the operation of machines of this character, the hay as it is being elevated will frequently overhang the guard rails, and it is desirable that no obstruction to its passage be present in its structure, and such is the object of extending the supporting bars 34 and forming a throat between them and the guard rails, which throat is continued inward and above the adjacent compressor bars for the same purpose, and also to permit the compressor to float upon the stream of hay.

Having shown and described one form of my invention, I do not desire that it be confined closely to the specific details of construction as illustrated, it being understood that changes may be made in the form and proportion of parts without departing from the spirit of the invention.

What I claim as my invention, and desire to secure by Letters Patent, is:

1. In a hay loader, elevator mechanism including a relatively fixed frame and hay elevating means thereon, a rising and falling compressor disposed above said elevating means, and laterally extending resilient supporting members upon the opposite sides of said frame, each of said members having one end secured to said fixed frame and having its opposite end pivotally connected with said compressor, said resilient members being bowed outwardly beyond the frame and elevating means and extending upwardly over said compressor, whereby a lateral movement of said compressor is permitted and whereby overhanging hay may be fed upwardly and delivered without clogging the elevating mechanism.

2. In a hay loader, an upwardly inclined elevator frame, an endless carrier mounted upon said frame and adapted to receive hay at a point in its travel, fixed guard rails carried by said frame upon opposite sides of and above said carrier, and a compressor disposed above said carrier comprising longitudinally arranged bars spaced apart laterally, having their lower ends pivotally connected with said frame and their upper ends secured to a transverse bar, said bar being supported by means of upwardly and laterally curved resilient members having their inner ends connected with said bar, their body portions disposed beyond said guard rails and their opposite ends secured to said frame whereby a lateral movement of said compressor is permitted and whereby overhanging hay may be fed upwardly and delivered without clogging the loader.

In testimony whereof I affix my signature.

EDWARD MOWRY.

Copies of this patent may be obtained for five cents each, by addressing the "Commissioner of Patents, Washington, D. C."